United States Patent
Maemura

(10) Patent No.: US 7,408,664 B2
(45) Date of Patent: Aug. 5, 2008

(54) HARASSMENT MAIL RECEPTION SUPPRESSING NETWORK FACSIMILE

(75) Inventor: Kohichiroh Maemura, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 983 days.

(21) Appl. No.: 10/607,066

(22) Filed: Jun. 25, 2003

(65) Prior Publication Data

US 2004/0066534 A1 Apr. 8, 2004

(30) Foreign Application Priority Data

Jun. 26, 2002 (JP) ............................. 2002-186060

(51) Int. Cl.
*G06K 1/00* (2006.01)
*H04N 1/00* (2006.01)
*H04N 1/32* (2006.01)
*G06F 15/16* (2006.01)

(52) U.S. Cl. ..................... 358/1.15; 358/402; 358/468; 709/233

(58) Field of Classification Search ............... 358/1.15, 358/402, 468; 395/200.48; 709/233
See application file for complete search history.

(56) References Cited

U.S. PATENT DOCUMENTS

| | | | |
|---|---|---|---|
| 5,159,465 A | 10/1992 | Maemura et al. | |
| 5,293,253 A | 3/1994 | Kida et al. | |
| 5,394,462 A | 2/1995 | Maemura | |
| 5,585,941 A | 12/1996 | Maemura | |
| 5,633,731 A | 5/1997 | Maemura | |
| 5,881,233 A * | 3/1999 | Toyoda et al. | ............... 709/233 |
| 6,025,924 A | 2/2000 | Miura et al. | |
| 6,041,183 A | 3/2000 | Hayafune et al. | |
| 6,199,102 B1 * | 3/2001 | Cobb | ......................... 709/206 |
| 6,281,980 B1 | 8/2001 | Maemura et al. | |
| 6,301,014 B1 | 10/2001 | Miura et al. | |
| 6,559,959 B2 | 5/2003 | Miura et al. | |
| 6,731,410 B2 * | 5/2004 | Saito et al. | ................... 358/468 |
| 6,952,805 B1 * | 10/2005 | Tafoya et al. | ................ 715/739 |
| 7,072,080 B1 * | 7/2006 | Yamamoto | ................... 358/442 |
| 2001/0049745 A1 * | 12/2001 | Schoeffler | .................... 709/238 |
| 2002/0131073 A1 * | 9/2002 | Toyoda et al. | ............... 358/1.15 |
| 2003/0016400 A1 | 1/2003 | Maemura | |
| 2003/0072032 A1 | 4/2003 | Maemura | |

OTHER PUBLICATIONS

U.S. Appl. No. 07/638,340, filed Jan. 7, 1991.
U.S. Appl. No. 07/767,816, filed Sep. 30, 1991.
U.S. Appl. No. 09/653,994, filed Sep. 1, 2001.

* cited by examiner

*Primary Examiner*—Houshang Safaipour
(74) *Attorney, Agent, or Firm*—Cooper & Dunham, LLP

(57) ABSTRACT

A network facsimile includes a facsimile function of communicating with a facsimile via a public network and an electronic mail transmission function of transmitting electronic mail containing an image in a prescribed format to a transmission destination connected a local or wide area network. An electronic mail address memory stores an electronic mail address of a transmission destination when the network facsimile transmits an electronic mail to the transmission destination. An electronic mail information storing device stores at least electronic mail information when the network facsimile receives the electronic mail information. Also included is an electronic mail scrap determination device configured to determine if an electronic mail sent from any one of the transmission destinations is to be scrapped when one of an electronic mail address and a domain assigned to the electronic mail has not been stored in the electronic mail address memory. An electronic mail scrapping device scraps an electronic mail stored in the electronic mail storing device in accordance with the determination of the electronic mail scrap determination device.

12 Claims, 5 Drawing Sheets

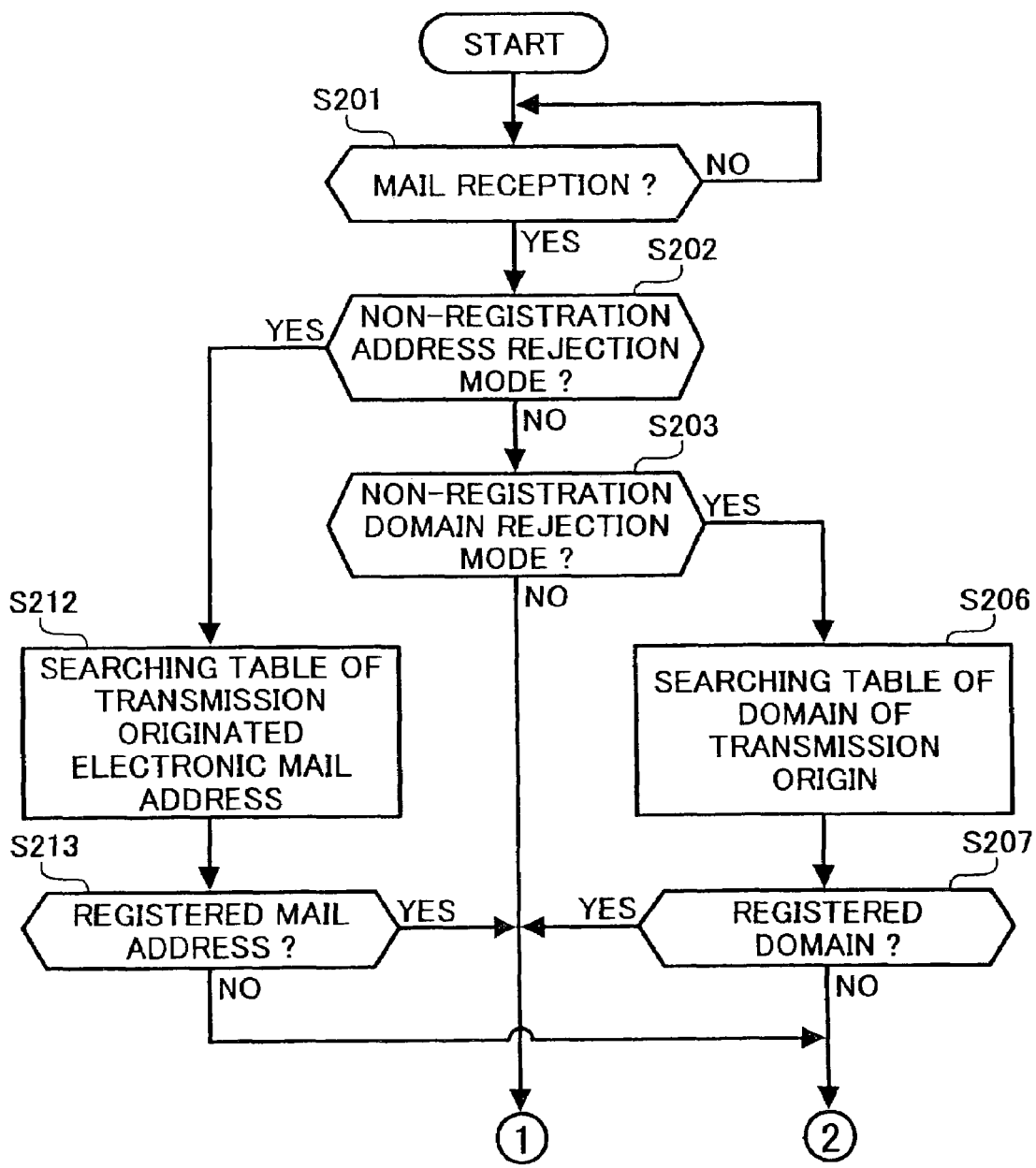

FIG. 4

| REGISTRATION NUMBER | TRANSMISSION MAIL ADDRESS | COMPARISON OBJECTIVE | | NUMBER OF TRANSMISSION TIMES : N |
|---|---|---|---|---|
| | | MAIL ADDRESS | DOMAIN | |
| #1 | abc@def.ghi.co.jp | — | ○ | 5 |
| #2 | opq@rs.tu.co.jp | — | ○ | 10 |
| #3 | ijk@coolmail.com | ○ | — | 20 |
| #4 | xyz@abc.ne.jp | — | ○ | 0 |
| ... | ... | ... | | |

HARASSMENT MAIL RECEPTION SUPPRESSING NETWORK FACSIMILE

FIELD

The present patent specification relates to a communications apparatus such as a network facsimile, in particular, to a network facsimile capable of scrapping undesirable electronic mail without previously setting a rejection condition for rejecting such electronic mail.

BACKGROUND

Recent developments in communications include a network facsimile connected to a local area network (LAN) or a wide area network (WAN), which is capable of communicating facsimile data with a facsimile in a prescribed facsimile transmission sequence and transmitting an electronic mail. Such a network facsimile enables communication of image information between a facsimile connected to a public network and a plurality of apparatuses each having a communication function, connected to the LAN or WAN. When a mail address of a network facsimile becomes known, undesirable electronic mail (e.g. junk mail or harassment mail) can be delivered. In such a situation, upon receiving electronic mail while executing a mail transfer instruction, the network facsimile generally prints contents thereof. As a result, normal work can be disturbed and recordation sheets can be wasted.

In order to reduce such inconvenience, a method has been proposed, in Japanese Patent Application Laid Open No. 11-355347, for controlling a network facsimile to designate mail addresses and domains such that only selected electronic mail would be transferred. However, inputting such mail addresses and domains can be burdensome for a user in such a method. Further, if the user erroneously inputs such information, desirable electronic mail may not be received.

SUMMARY

This disclosure provides a written description of a novel network facsimile including a facsimile function that is capable of communicating with a facsimile via a public network using a facsimile transmission procedure and an electronic mail transmission function that is capable of transmitting electronic mail containing an image in a prescribed format to a transmission destination connected one of local and wide area networks. An electronic mail address memory is provided to store an electronic mail address of a transmission destination when the network facsimile transmits electronic mail to the transmission destination. An electronic mail information storing device is provided to store at least electronic mail information when the network facsimile receives the electronic mail information. An electronic mail scrap determination device is also provided to determine that electronic mail sent from any one of the transmission destinations is to be scrapped when one of an electronic mail address and a domain assigned to the electronic mail has not been stored in the electronic mail address memory. An electronic mail scrapping device is provided to scrap (delete or reject) electronic mail stored in the electronic mail storing device in accordance with the determination of the electronic mail scrap determination device.

In another embodiment, a checking objective selecting device is provided to select one of an electronic mail address and a domain as a checking objective checked by the electronic mail scrap determination device.

In yet another embodiment, the checking objective is selected by the network facsimile in accordance with an electronic mail sender.

In yet another embodiment, a scrap information storing device is provided to store scrap information when it is determined that the electronic mail should be scrapped. A scrap information checking device is also provided to check contents of the scrap information.

In still yet another embodiment, a scrap information storing device is provided to store scrap information when it is determined that the electronic mail should be scrapped. A scrap information transmitting device is also provided to transmit the scrap information to a recipient of the electronic mail via any one of the networks.

DETAILED DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:, FIG. 1 illustrates a network system in which an exemplary network facsimile is built according to a preferred embodiment;

FIG. 4 is a table illustrating a mail address or domain to be selected as a comparison objective.

PREFERRED EMBODIMENTS

Figure 1:
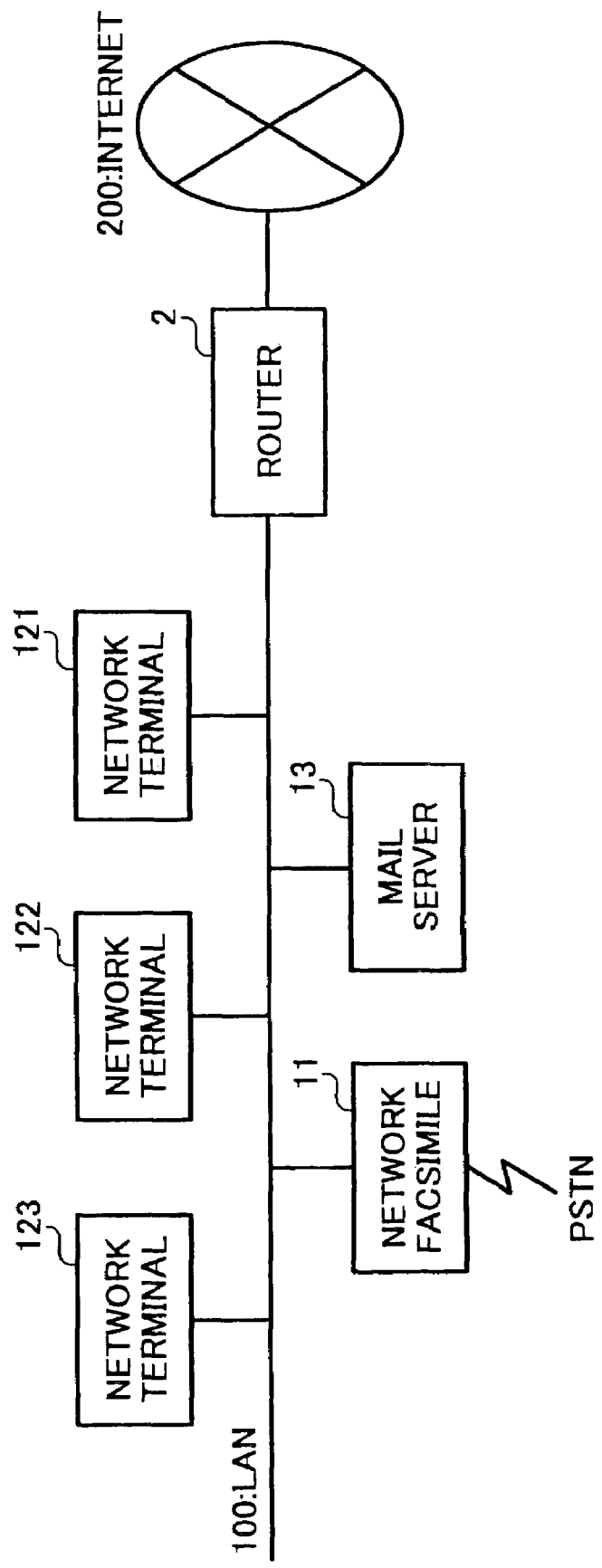

Referring now to the drawings, wherein like reference numerals and marks designate identical or corresponding parts throughout several views, in particular in FIG. 1, a network system in which an exemplary network facsimile is built is illustrated. As shown, a network facsimile 11, a plurality of network terminals 121, 122, and 123, and a mail server 13 are connected to a LAN 100. The LAN 100 is further connected to an Internet 200 through a router 2. The mail server 13 is capable of providing well known services of correcting and that utilize the plurality of network terminals 121, 122, and 123. Each of the communications terminals 121, 122, and 123 includes a facsimile function of communicating image information using, e.g., a G3 facsimile transmission procedure and a function of communicating various data through the LAN 100.

The network facsimile 11 includes a function of communicating electronic mail to each of the communications terminals 121, 122, and 123. Further, the network facsimile 11 includes a function of communicating image information using, e.g., a G3 facsimile transmission procedure via a public network (PSTN).

Figure 2:
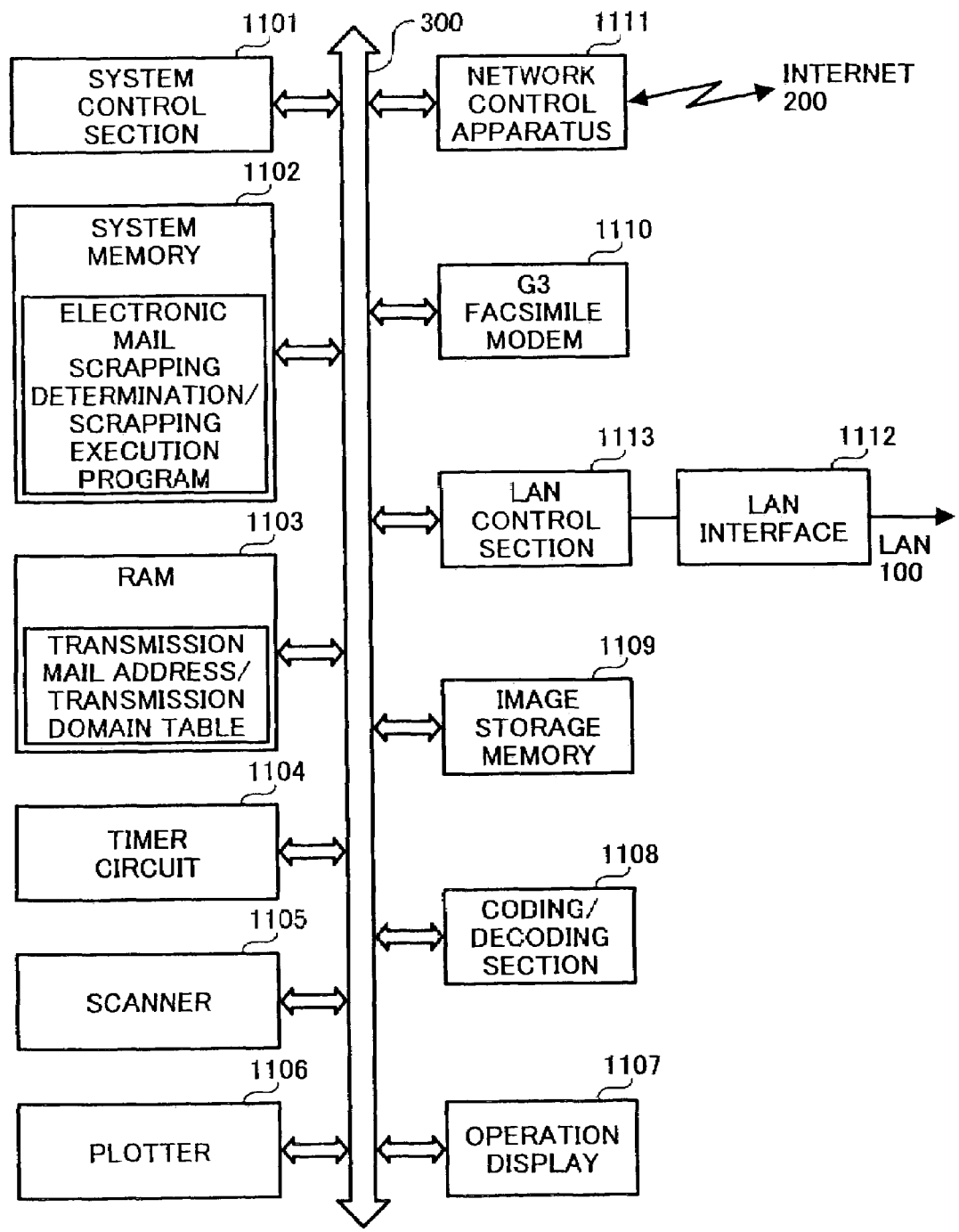
FIG. 2 illustrates the network facsimile.

As shown in FIG. 2, a system control section 1101 is provided in the network facsimile 11 to control each section thereof to operate, and performs various control operations such as a facsimile transmission control procedural operation. A system memory 1102 is provided to store control operational program such as electronic mail scrap determination/execution program executed by the system control section 1101. The electronic mail scrap determination/execution program is executed by the system control section 1101. Thus, the electronic mail scrap determination/execution program constitutes an electronic mail scrap determination/execution device in cooperation with the system control section 1101. Further, the system memory 1102 stores various data and operation manuals used when the processing program is executed, and distribution files such as service program data for setting and operating the network facsimile 11 via the LAN 100.

A RAM 1103 is also provided to store various information items inherent to the network facsimile 11 and constitutes a work area for the system control section 1101. A timer circuit 1104 is provided as a source of timing information.

A scanner 1105 is provided to read an original image at a prescribed resolution. A plotter 1106 is also provided to print an image at a prescribed resolution. An operation panel 1107 is provided to allow a user to operate the network facsimile 11, and includes various operation keys and display instruments.

A coding and decoding section 1108 is provided for coding and compressing image signals, and decoding thus coded and compressed image signals to restore them. An image storage memory 1109 is provided to store various image information items that may be coded and compressed.

A G3 (Group 3 Facsimile) MODEM 1110 is provided for a MODEM function, and includes a low speed MODEM function such as a V.21 MODEM function capable of communicating transmission procedural signals, and a high speed MODEM function such as V. 17, V. 34, V. 29, and V. 27ter MODEM functions, etc., capable of communicating image information.

A network control apparatus 1111 is provided to connect a facsimile to the public network, and has an automatic transmission and reception functions.

A LAN interface 1112 is provided to connect the network facsimile 11 to the LAN 100. A LAN control section 1113 is provided to execute a communications control operation of prescribed various protocol suites communicating various data with another data terminal via the LAN 100.

These system control section 1101, system memory 1102, parameter memory 1103, timer circuit 1104, scanner 1105, plotter 1106, operational display 1107, coding/decoding section 1108, image storage memory 1109, G3 facsimile MODEM 1110, network control apparatus 11111, and LAN transmission control section 1113 are connected to an internal bus 300. Thus, communications of data between respective elements are performed via the internal bus 300.

Further, communications of data between the network control apparatus 1111 and G3 facsimile MODEM 1110 are directly performed. In this embodiment, communications of data between terminals connected to the LAN 100 are essentially performed while applying combination of transmission protocol of a transport layer called TCP/IP, and communication protocol of the upper rank layer (i.e., protocol suite). For example, when communicating data of an electronic mail, a transmission protocol such as SMTP (Simple Mail Transfer Protocol) of the upper rank layer is applied. Further, the protocol to be applied when each terminal requests the mail server 1113 to confirm reception of an electronic mail directed thereto and transmission thereof, can be POP (Post Office Protocol).

These transmission protocol, such as TCP/IP, SMTP, POP, etc., data format, and data structure of the electronics mail are standardized by RFC (Request For Comments) documents published by IETF (Internet Engineering Task Force), that organizes technologies related to the Internet. For example, TCP and IP are standardized by RFC793. SMTP is standardized by RFC821.

A format of the electronic mail is standardized by RFC822, RFC1521, and RFC1522 (i.e., MPME (Multi Purpose Mail Extension) format). The network facsimile 11 reads and transmits an original image to either the other G3 facsimile via the public network (PSTN), or users of communications terminals 121, 122, and 123 via the LAN 100 (or Internet). The network facsimile 11 further transfers image data received from the other G3 facsimile via the public network PSTN to a user corresponding to a sub-address designated at that time using electronic mail. The network facsimile 11 includes a transfer service function of transferring the image information received from a workstation "WS" (not shown) by means of electronic mail to a G3 facsimile of the public network PSTN in correspondence with a designated abbreviated dial.

Further, the network facsimile 11 extracts and prints image information contained in electronic mail received thereby. Since facsimile image information is binary state, and an electronic mail cannot directly include the binary data, the binary data is converted into a readable image (seven bits character code) by applying a prescribed conversion method (e.g. Base 64 coding method) and is included in electronic mail. Such a format of electronic mail is called the MIME format.

Further, a coding method, such as UUENCODE, Quated-Printable, etc., can be applied as the conversion method used when information of the MIME format is generated.

In such a network facsimile 11, a mail address is disclosed for the purpose of accepting a service request. However, undesirable electronic such as junk mail is sometimes transmitted to the disclosed mail address. Normal operation can be disrupted or unduly loaded by such undesirable of junk mail.

As illustrated in a table in FIG. 4, this example includes an address book in a RAM 103 to store senders whose transmissions of electronic mail are permitted. Thus, senders of electronic mails are limited. When limiting reception of such electronic mail, it is determined in accordance with system setting details whether a mail permission address table or domain permission table is referred to.

As shown in the table of FIG. 4, one of transmission mail address and domain is selected to be a comparison objective in each case (#1 to #4). Specifically, one of selected transmission mail address and domain is compared with that in an electronic mail address included in an incoming electronic mail to determine whether the mail is permissible. However, when the number of transmissions from the network facsimile 11 to a prescribed transmission destination does not reach a prescribed level "N" (in the case #4), or when the number reaches the prescribed level but is neglected by a user, a transmission address or domain of an electronic mail from such a transmission destination is not compared for scrapping. Further, when a domain whose electronic mail account is obtained charge-free is compared, an undesirable electronic mail therefrom cannot be scrapped. Thus, as shown by the case #3 in the table 1, a mail address is selected to compare.

Further, as shown in the address book of the table, a list does not, but can include, a telephone number to be used when an electronic mail is transferred. The network facsimile 11 includes non-storage address and domain rejection modes, and is capable of appropriately setting one of the modes as described below. Further, each of these modes also includes a transfer mode transferring an electronic mail to be scrapped to a prescribed destination such as a system manager, a client, etc.

Figure 3B:
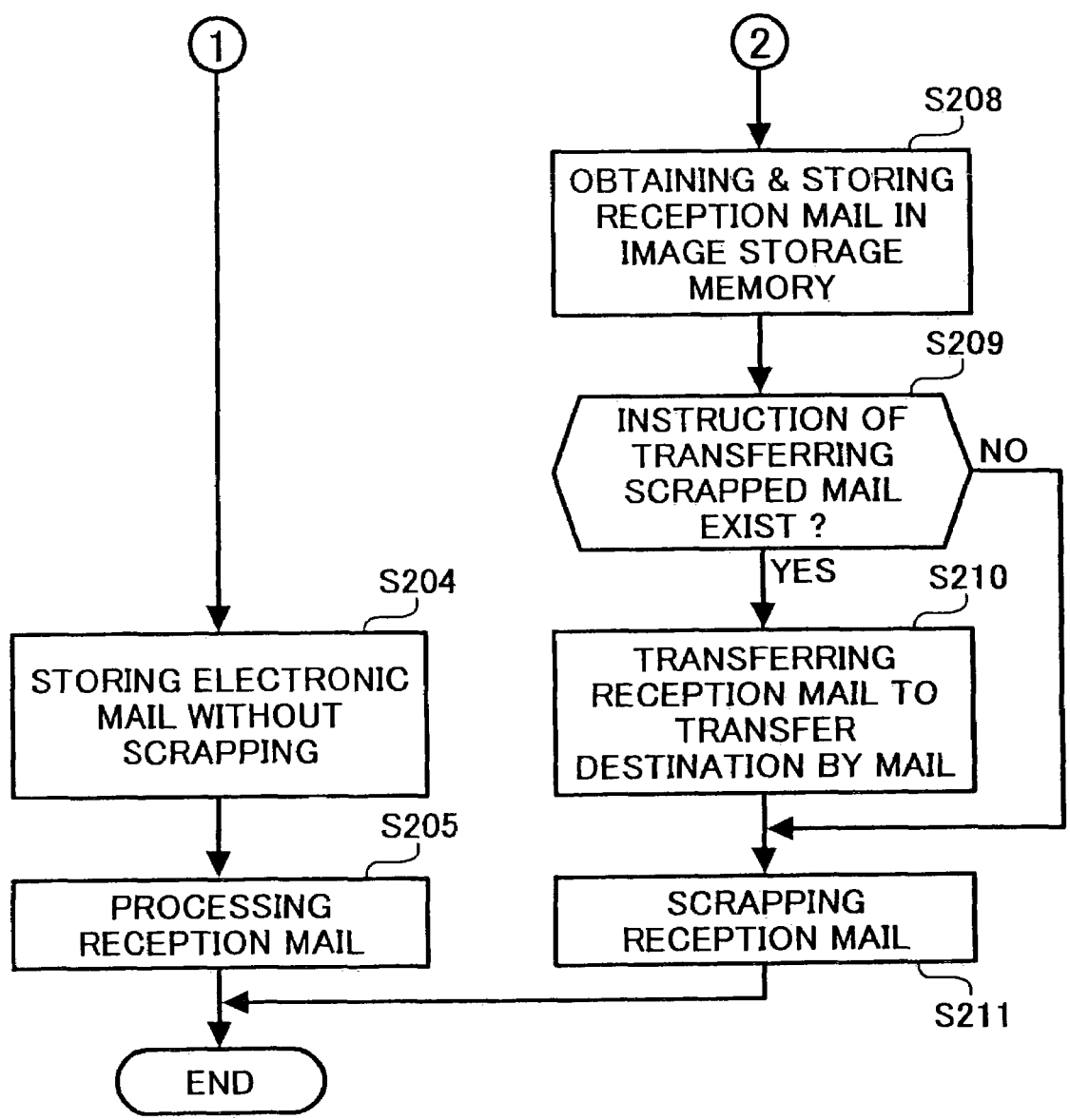
FIG. 3 is a flowchart illustrating processing of electronic mail received by the network facsimile.

Thus, a transfer flag determining in these modes if a reception mail is transferred to a prescribed transfer destination and a transfer destination mail address are also stored. The network facsimile 11 executes an operation as shown in FIGS. 3A and 3B upon receiving an electronic mail.

Specifically, the network facsimile 11 initially inquiries to the mail server 1113 if an electronic mail directed to its own terminal is received. If the answer is Yes in step S201, the process then checks if the non-storage address rejection mode is set (in step S202). If the answer in step s202 is No, the process then checks if the non-storage domain rejection mode is set (in step S203).

If the answer is No in step S203, namely, none of the non-storage address and domain rejection modes are set, an electronic mail received from the mail server 13 is not scrapped and is reserved (in step S204). Then, an operation is started in accordance with details of the electronic mail (in step S205). The operation may include printing the details of the electronic mail by the plotter 1106, transferring the electronic mail from the LAN interface 1112 to the other network facsimile or computer stations via the LAN 100, and transferring the electronic mail from the network control apparatus 1106 to the other network facsimile or computer stations via the Internet 200.

When the electronic mail includes a request for transferring it to a prescribed transfer destination, image-information included in a body text information enclosed in the electronic mail is transferred to the G3 facsimile of the public network PSTN in correspondence with a designated abbreviated dial or a user having a mail address by means of any one of facsimile and electronic mail. In contrast, when the electronic mail lacks such a request, image information arranged in the body text is extracted and printed.

Further, if the non-storage domain rejection mode is set in step S203, the process checks in step S207 if the same domain has been stored in the address book of the RAM 1103 by searching for and extracting the domain of the sender's address from the from-field included in the header of the received electronic mail in step S206. If the answer in step s207 is Yes, the process goes to steps S204 and S205 to preserve the electronic mail without scrapping and execute an operation in accordance with contents of the electronic mail.

In contrast, if the domain has not been stored (as determined in step S207), the received electronic mail is obtained and preserved in the image storage memory 1109 (in step S208). Then, the process checks if the transfer flag is set by the network facsimile 11 at that time, and accordingly, a transferring operation is designated (in step S209).

If the transferring operation is designated, the electronic mail stored in the image storage memory 1109 is transferred as it is to a prescribed transfer destination (in step S210) Simultaneously, the electronic mail preserved in the image storage memory 1109 is scrapped (in step S211). A mail address of such a prescribed transfer destination may include those of the system manager and clients or the like. Further, if the transferring operation transferring an electronic mail to be scrapped to a prescribed destination is not designated, the process goes to step S211 in order to scrap the electronic mail.

If the non-storage address rejection mode is set (the answer is Yes in step S202), the process checks (in step S213) if the same mail address has been stored by extracting a mail address of a sender from a from-field of a header included in the received electronic mail, and searching the address book of the RAM 1103 (in step S212). If the answer at step s212l it is positive, the process goes to steps S204 and S205 to preserve the electronic mail without scrapping, and execute an operation in accordance with contents of the electronic mail.

In contrast, if it is determined that the domain of the sender has not been stored (in step S213), the process returns to the above-mentioned step S208.

According to this embodiment, since there is a limitation on senders' mail addresses or domain names, undesirable electronic mail such as a direct mail or junk mail can be suppressed, thereby an appropriate communications service can be provided by a network facsimile.

Further, various information items, such as an electronic mail address, a reception date, a scrapped date, a detail of the electronic mail, etc., related to an electronic mail to be scrapped can be output by a user as a report.

Further, since a transfer destination of an electronic mail to be scrapped, or other information about the scrapped mail, can be stored, inadvertently scrapped mail, or at lease information thereon, can be retrieved for efficient system management.

Numerous additional modifications and variations of the present invention are possible in light of the above teachings. It is therefore to be understood that within the scope of the appended claims, the present invention may be practiced other than as specifically described in the examples herein.

This application claims priority under 35 USC § 119 to Japanese Patent Application No. 2002-186060 filed on Jun. 26, 2002, the entire contents of which are hereby incorporated by reference in this disclosure.

What is claimed is:

1. A network facsimile, comprising:
    a facsimile function operative to communicate with facsimiles via public network using a facsimile transmission procedure;
    an electronic mail transmission function operative to transmit an electronic mail containing an image in a prescribed format to at least one transmission destination connected to a local or a wide area networks;
    an electronic mail address memory configured to store an electronic mail address of a transmission destination when the network facsimile transmits an electronic mail to the transmission destination;
    an electronic mail address extraction device configured to extract said electronic mail address, designated when said electronic mail is transmitted to said transmission destination, and store the extracted electronic mail address in said electronic mail address memory;
    an electronic mail information storing device configured to store at least electronic mail information when the network facsimile receives the electronic mail information;
    an electronic mail scrap determination device configured to determine if a received electronic mail is to be scrapped when an electronic mail address or a domain assigned to the electronic mail has not been stored in the electronic mail address memory;
    an electronic mail scrapping device configured to scrap the received electronic mail in accordance with a determination of the electronic mail scrap determination device; and
    a checking objective selecting device configured to select one of an electronic mail address and a domain as a checking objective checked by the electronic mail scrap determination device,
    wherein said checking objective is selected by the network facsimile in accordance with an electronic mail sender.

2. The network facsimile according to claim 1, further comprising:
    a scrap information storing device configured to store scrap information when the electronic mail is to be scrapped; and
    a scrap information checking device configured to check contents of the scrap information.

3. A network facsimile according to claim 1, further comprising:
    a scrap information storing device configured to store scrap information when the electronic mail is to be scrapped; and
    a scrap information transmitting device configured to transmit the scrap information to a recipient of the electronic mail via any one of the networks.

4. The network facsimile of claim 1, wherein the electronic mail address of the transmission destination is automatically stored in the electronic mail address memory, when the network facsimile transmits the electronic mail to the transmission destination.

5. A method for scrapping undesirable electronic mail without opening in a network facsimile, said method comprising the steps of:
- storing an electronic mail address of a transmission destination when the network facsimile transmits an electronic mail to the transmission destination via any one of public, local, and wide area networks;
- storing at least electronic mail information when the network facsimile receives the electronic mail information via the networks;
- determining that a received electronic mail is to be scrapped when one of an electronic mail address and a domain assigned to the electronic mail has not been stored;
- scrapping the received electronic mail in accordance with the determination;
- storing scrap information when the electronic mail is determined to be scrapped; and
- checking contents of the scrap information before performing the step of scrapping.

6. The method according to claim 5, further comprising the step of selecting one of an electronic mail address and a domain as a checking objective in accordance with an electronic mail sender before performing the step of determining.

7. A method for scrapping undesirable electronic mail without opening in a network facsimile, said method comprising the steps of:
- storing an electronic mail address of a transmission destination when the network facsimile transmits an electronic mail to the transmission destination via any one of public, local, and wide area networks;
- storing at least electronic mail information when the network facsimile receives the electronic mail information via the networks;
- determining that a received electronic mail is to be scrapped when one of an electronic mail address and a domain assigned to the electronic mail has not been stored;
- scrapping the received electronic mail in accordance with the determination;
- storing scrap information when the electronic mail is determined to be scrapped; and
- transmitting the scrap information to a recipient of the electronic mail via any one of the networks before performing the step of scrapping.

8. The method according to claim 7, further comprising the step of selecting one of an electronic mail address and a domain as a checking objective in accordance with an electronic mail sender before performing the step of determining.

9. A network facsimile, comprising:
- means for communicating with facsimiles via a public network using a facsimile transmission procedure;
- means for transmitting an electronic mail containing an image in a prescribed format to at least one transmission destination connected to any one of public, local, and wide area networks;
- means for scoring an electronic mail address of a transmission destination when the network facsimile transmits an electronic mail to the transmission destination;
- means for storing at least electronic mail information when the network facsimile receives the electronic mail information;
- electronic mail scrap determination means for determining that a received electronic mail is to be scrapped when one of an electronic mail address and a domain assigned to the electronic mail has not been stored in the electronic mail address storing means;
- means for scrapping the received electronic mail in accordance with the determination of the electronic mail scrap determination means; and
- a checking objective selecting device configured to select one of an electronic mail address and a domain as a checking objective checked by the electronic mail scrap determination device,
- wherein said checking objective is selected by the network facsimile in accordance with an electronic mail sender.

10. A network facsimile having a facsimile function operative to communicate with facsimile devices via a public network using a facsimile transmission procedure, and having an electronic mail transmission function operative to transmit an electronic mail containing an image in a prescribed format to at least one transmission destination connected to a local or wide area network, comprising:
- an electronic mail address memory configured to store at least one of electronic mail address information and domain information of a transmission destination, when the network facsimile transmits a first electronic mail to the transmission destination via any one of public, local and wide area networks;
- an electronic mail information storing device configured to store at least electronic mail information of a second electronic mail received by said network facsimile from an e-mail sender, when the network facsimile receives the electronic mail information;
- an electronic mail scrap determination device configured to output a determination whether said second electronic mail is to be scrapped, determined based on whether at least one of a domain and an e-mail address assigned to the second electronic mail is not one to which e-mails have been sent by the network facsimile, based on the address information and domain information stored in said electronic mail address storage device;
- an electronic mail scrapping device configured to scrap said second electronic mail stored in the electronic mail storing device in accordance with said determination of the electronic mail scrap determination device; and
- a checking objective selecting device configured to select one of an electronic mail address and domain as a checking objective checked by the electronic mail scrap determination device,
- wherein said checking objective is selected by the network facsimile in accordance with an electronic mail sender.

11. The network facsimile according to claim 10, further comprising:
- a scrap information storing device configured to store scrap information when the second electronic mail is to be scrapped; and
- a scrap information checking device configured to check contents of the scrap information.

12. The network facsimile according to claim 10, further comprising:
- a scrap information storing device configured to store scrap information when the second electronic mail is to be scrapped; and
- a scrap information transmitting device configured to transmit the scrap information to a designated destination via any one of the networks.

* * * * *